(12) United States Patent
McLaughlin et al.

(10) Patent No.: US 9,925,648 B2
(45) Date of Patent: Mar. 27, 2018

(54) THREAD PROTECTOR DRIVE MECHANISM

(71) Applicant: JMP ENGINEERING INC., London (CA)

(72) Inventors: Kenneth Douglas McLaughlin, St. Thomas (CA); Brent Thomas Bell, London (CA); Kevin Wade Ackerman, London (CA)

(73) Assignee: JMP ENGINEERING INC., London, Ontario (CA)

( * ) Notice: Subject to any disclaimer, the term of this patent is extended or adjusted under 35 U.S.C. 154(b) by 105 days.

(21) Appl. No.: 14/740,451

(22) Filed: Jun. 16, 2015

(65) Prior Publication Data

US 2015/0360354 A1    Dec. 17, 2015

Related U.S. Application Data

(60) Provisional application No. 62/012,501, filed on Jun. 16, 2014.

(51) Int. Cl.
*B25B 23/14* (2006.01)
*B25B 27/14* (2006.01)
*B25B 21/00* (2006.01)
*B23P 19/06* (2006.01)

(52) U.S. Cl.
CPC ............ *B25B 21/002* (2013.01); *B23P 19/06* (2013.01); *Y10T 29/49767* (2015.01); *Y10T 29/49883* (2015.01); *Y10T 29/53687* (2015.01); *Y10T 29/53987* (2015.01)

(58) Field of Classification Search
CPC .. B25B 21/002; B23P 19/06; Y10T 29/49883; Y10T 29/53687; Y10T 29/53987; Y10T 29/49767
See application file for complete search history.

(56) References Cited

FOREIGN PATENT DOCUMENTS

JP            618239        *   1/1986

* cited by examiner

*Primary Examiner* — John C Hong

(57) ABSTRACT

A drive mechanism for installing thread protectors on threaded pipe ends having a servo motor, a housing, a shaft assembly, and a gripper with a plurality of jaws. The shaft assembly has a hollow shaft, rotationally mounted within the housing, and a solid shaft slidably mounted within the hollow shaft. The hollow shaft and solid shaft are coaxial and rotationally coupled. The gripper is mounted on the end of the solid shaft, outside of the housing, and is biased away from the housing. A sensor monitors the relative axial motion between the solid shaft and the hollow shaft.

13 Claims, 11 Drawing Sheets

THREAD PROTECTOR DRIVE MECHANISM

CROSS-REFERENCE TO RELATED APPLICATIONS

This application claims the benefit of U.S. provisional application No. 62/012,501, filed Jun. 16, 2014, the entirety of which is incorporated herein by reference.

FIELD OF THE INVENTION

This invention relates to robotic drive mechanisms, in particular, to drive mechanisms for installation of male and female thread protectors or pipe couplings on threaded pipe ends. The invention will be described with reference to the thread protector application example.

BACKGROUND

Thread protectors are cap or plug-like devices, used to prevent damage to the threads on the ends of pipe lengths during transport from a manufacturing facility to an installation site. These devices are typically installed as a part of the pipe manufacturing process. The installation of thread protectors is often a rate limiting step in the manufacturing process or bottleneck in a production facility.

Drive mechanisms are known for the installation of thread protectors. The process generally involves grasping, positioning, and aligning a thread protector adjacent to a pipe end and mechanically rotating the thread protector to engage the threads of the pipe end, thereby securing the thread protector on the pipe end. The rotational motive force in drive mechanisms is provided by means of pneumatic motors, alternating current motors, or alternating current motors with variable frequency drives. These drive systems are subject to a number of disadvantages, such as limited programmability, lack of accurate torque control, and limited speed control. This limited programmability, accuracy, and control can result in slower cycle speeds, less accurate torque application, lower torque application, and inaccurate thread protector positioning.

SUMMARY OF THE INVENTION

A drive mechanism, according to the present invention, is used for installing thread protectors on threaded pipe ends and has a servo motor, a housing, and a shaft assembly. The shaft assembly has a hollow shaft, mounted within the housing and rotated by the servo motor, and a solid shaft slidably mounted within the hollow shaft that rotates with the hollow shaft. A gripper with a plurality of gripper jaws is mounted to the solid shaft outside of the housing and is biased away from the housing. A sensor on the housing monitors the relative axial motion between the solid shaft and the hollow shaft.

In another embodiment, the hollow shaft has an annular cross section with one or more keyway apertures about its circumference and the solid shaft has one or more drive keys extending radially that fit within the keyway apertures to rotationally couple the solid shaft with the hollow shaft and permit relative axial motion therebetween.

According to another aspect of the present invention, a method of installing a thread protector on a threaded pipe end is provided having the following steps. Moving a threaded pipe to a position, which defines the alignment of the axis of the pipe, gripping a thread protector with a drive mechanism, according to the present invention, aligning the thread protector off-centre relative to the threaded pipe, and advancing the thread protector along the axis of the pipe until the thread protector makes contact with the pipe end. Then continuing to advance the thread protector until the gripper is in the fully compressed position, calculating the position of the pipe end, retracting the drive mechanism. Finally, aligning the thread protector with the axis of the pipe, advancing the thread protector until it is adjacent the pipe end, and rotating the thread protector and advancing the drive mechanism to install the thread protector.

BRIEF DESCRIPTION OF THE DRAWINGS

In order that the invention may be more clearly understood, a preferred embodiment thereof will now be described in detail by way of example, with reference to the accompanying drawings, in which.

DESCRIPTION OF THE INVENTION

The drive mechanism according to the present invention is operationally attached to the end of a robotic arm and functions as an end effector to accomplish the steps of gripping, aligning, and rotationally installing a thread protector on a pipe end. In some applications, the robotic arm is also programmable to locate and grasp a thread protector on an incoming conveyor to thereby further automate the process of installing thread protectors.

The drive mechanism has rotatable jaws to grip the thread protector and is powered by a servo motor that is programmably controlled to accomplish the various steps in the installation process as described herein. The drive mechanism comprises a housing, a servo motor, and a set of pneumatically powered jaws that are mounted on a shaft assembly within the housing. The shaft assembly is powered by a programmably controlled servo motor by means of a belt drive.

As shown in FIGS. 1-5, a servo motor 1 is attached to a housing 2. By way of an example, an Allen-Bradley® MPL-540K-MJ72AA servo motor is used, but other servo motors may be used to power the drive mechanism. The servo motor 1 supplies power to the shaft assembly 4 by way of a belt drive 3 assembly and operates in response to direction from a robot controller. Using feedback from the servo motor 1, the robot controller varies current to the servo motor 1 to achieve the desired motor control. This allows the robot controller to precisely monitor the number of turns a thread protector has been applied, as well as the precise speed and torque at which it has been applied.

Figure 1:
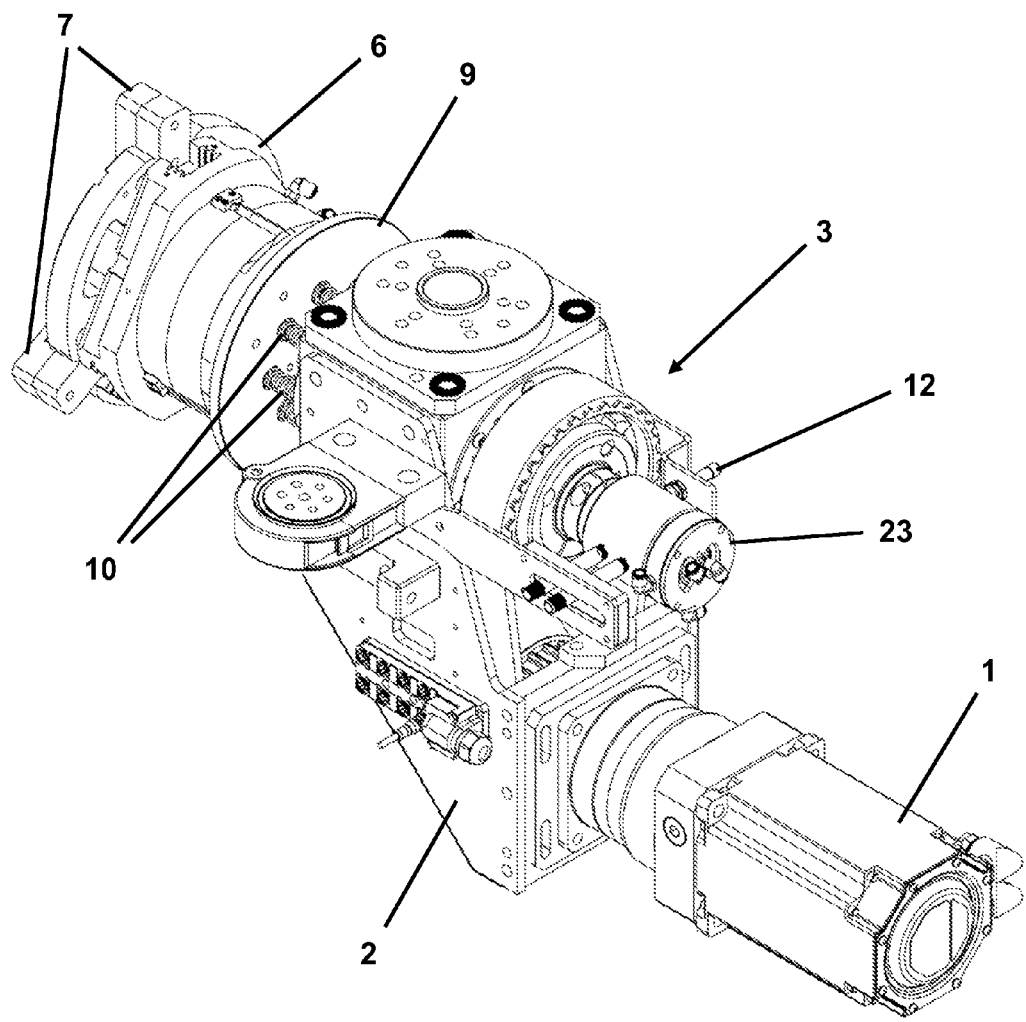
FIG. 1 is a perspective view of a drive mechanism, according to the present invention, with a portion of the housing removed.
Figure 2:
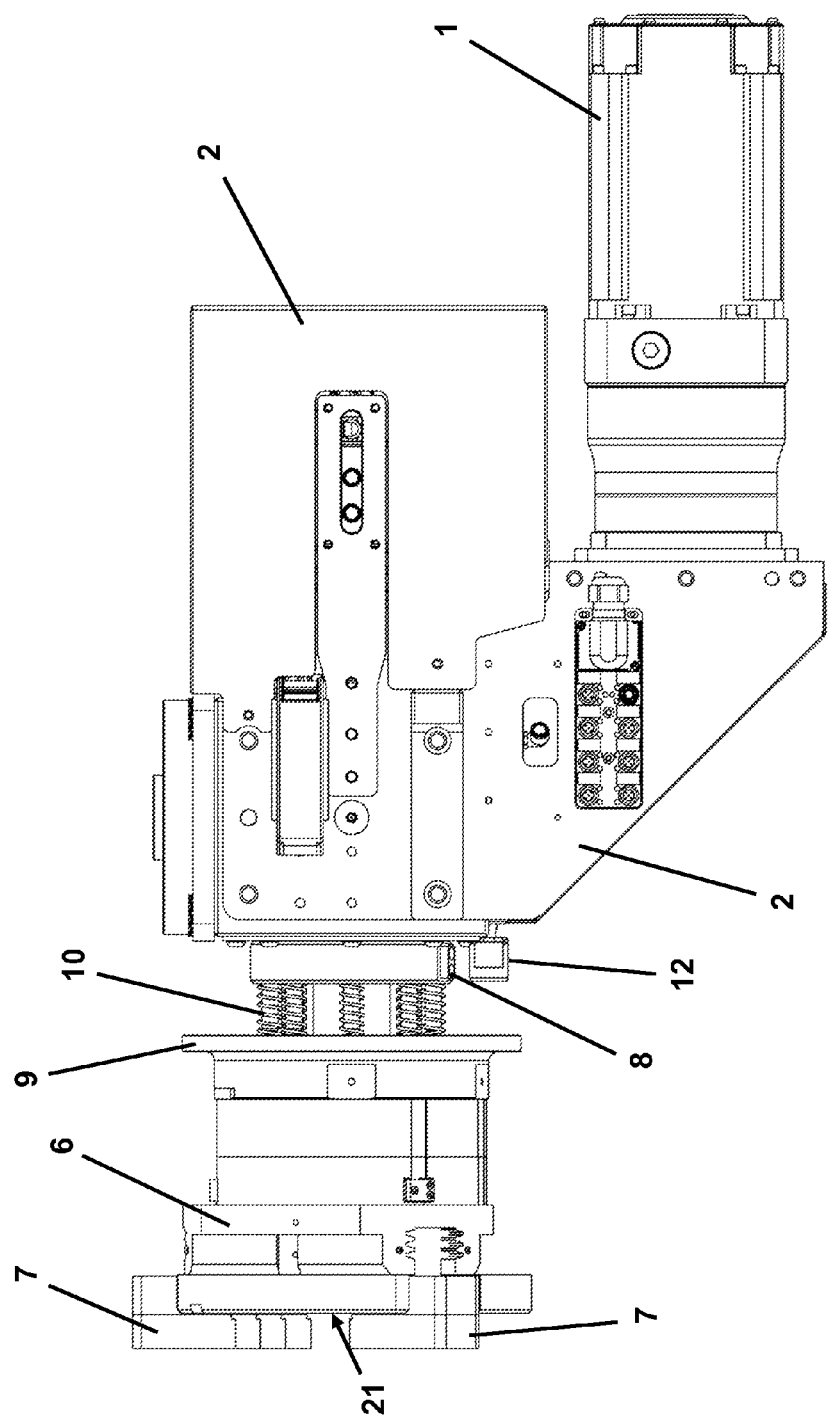
FIG. 2 is a side view of the drive mechanism.
Figure 3:
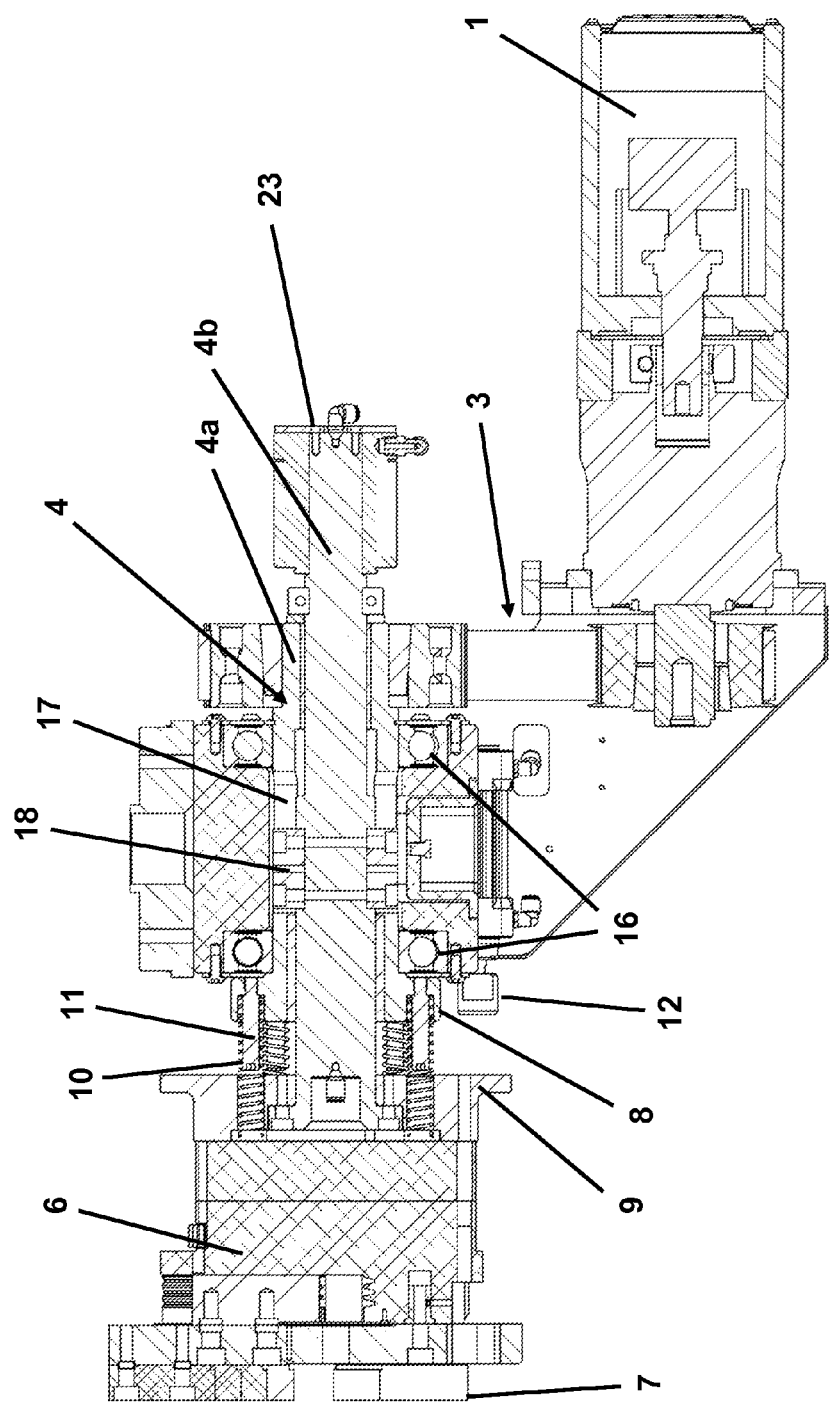
FIG. 3 is a sectional side view of the drive mechanism, with a portion of the housing removed.
Figure 4:
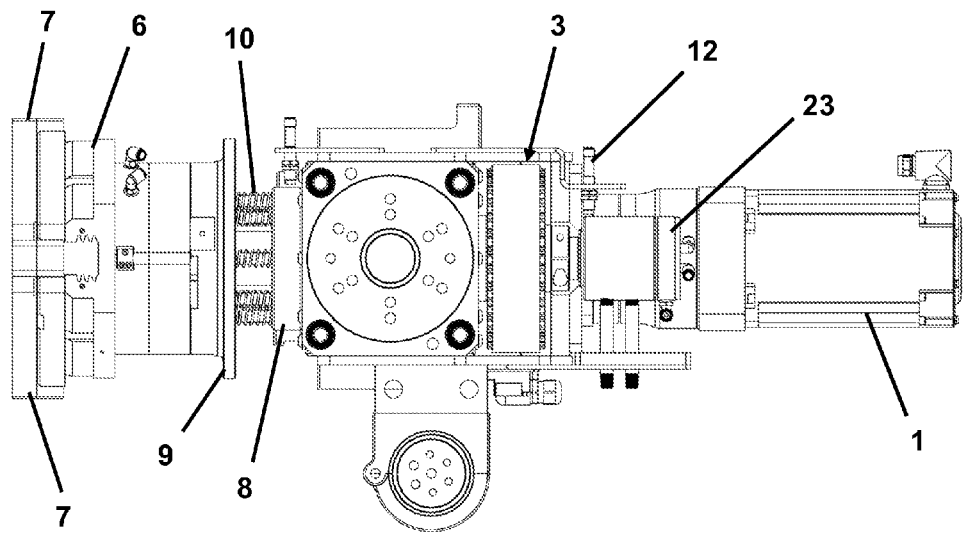
FIG. 4 is a top view of the drive mechanism, with a portion of the housing removed.
Figure 5:
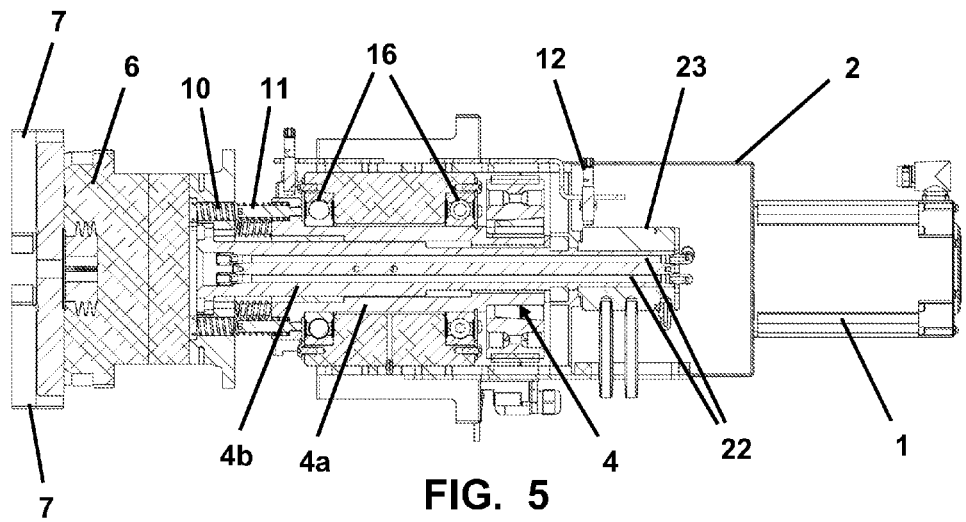
FIG. 5 is a sectional top view of the drive mechanism.
Figure 6:
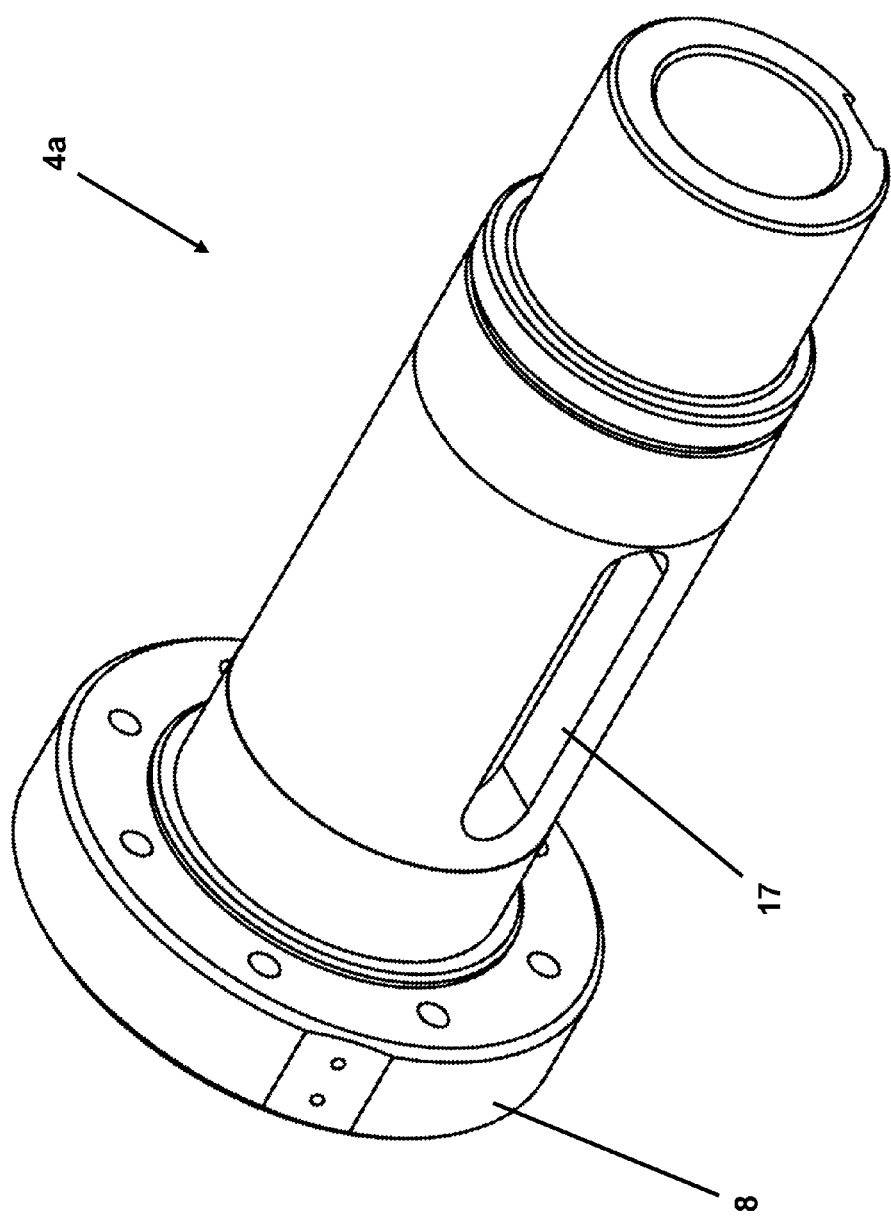
FIG. 6 is a perspective view of the hollow shaft of the drive mechanism.
Figure 7:
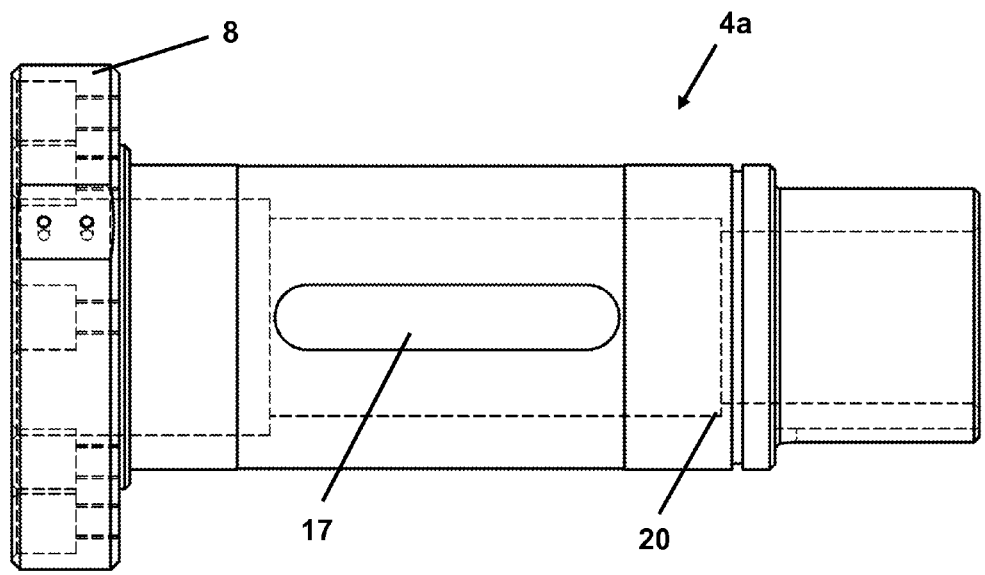
FIG. 7 is a side view of the hollow shaft.
Figure 8:
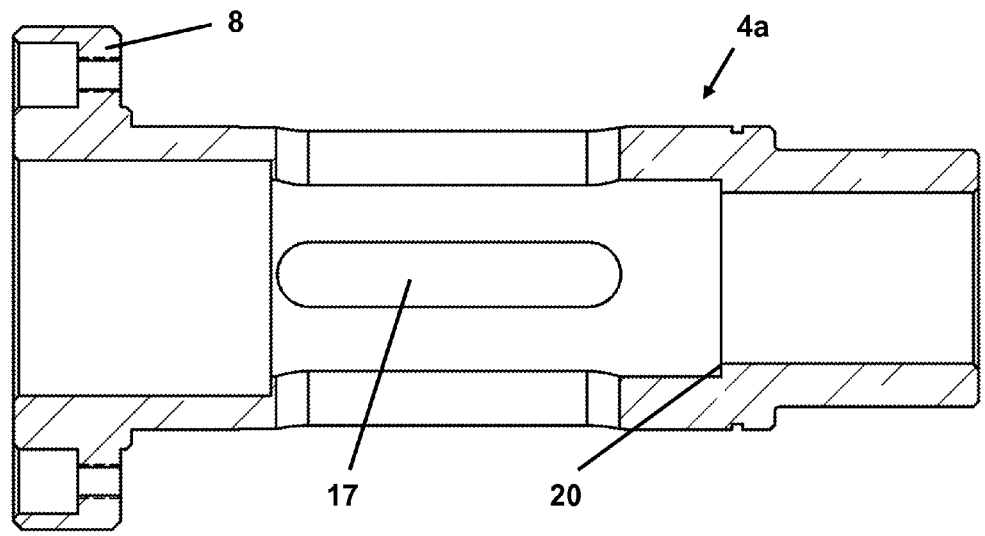
FIG. 8 is a sectional side view of the hollow shaft.
Figure 14:
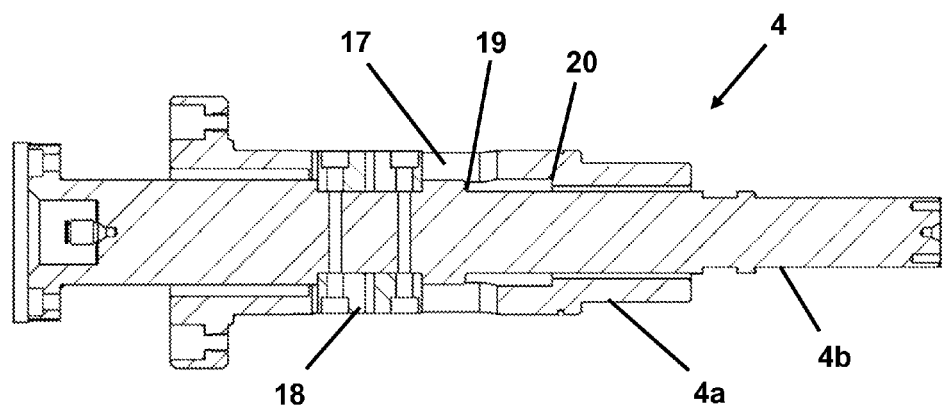
FIG. 14 is a sectional side view of the shaft assembly.

As shown in FIG. 14, the shaft assembly 4 consists of a solid shaft 4b concentrically, or coaxially mounted within a hollow shaft 4a. As shown in FIGS. 6-8, the hollow shaft 4a is cylindrically shaped, with an annular cross section having a wall thickness. As shown in FIGS. 3 and 5, the hollow shaft 4a is mounted within the housing 2. Preferably, the hollow shaft 4a is mounted by way of a double bearing arrangement 16 at each end of the hollow shaft 4a. Radial and axial motion of the hollow shaft 4a is thereby restricted, while rotational motion is permitted. Longitudinal keyway apertures 17 are formed in the hollow shaft 4a wall that provide access to the hollow interior of the hollow shaft 4a. Preferably, as shown in FIGS. 7 and 8, two keyway apertures 17 are located radially opposite one another at about the midpoint of the hollow shaft 4a.

Figure 9:
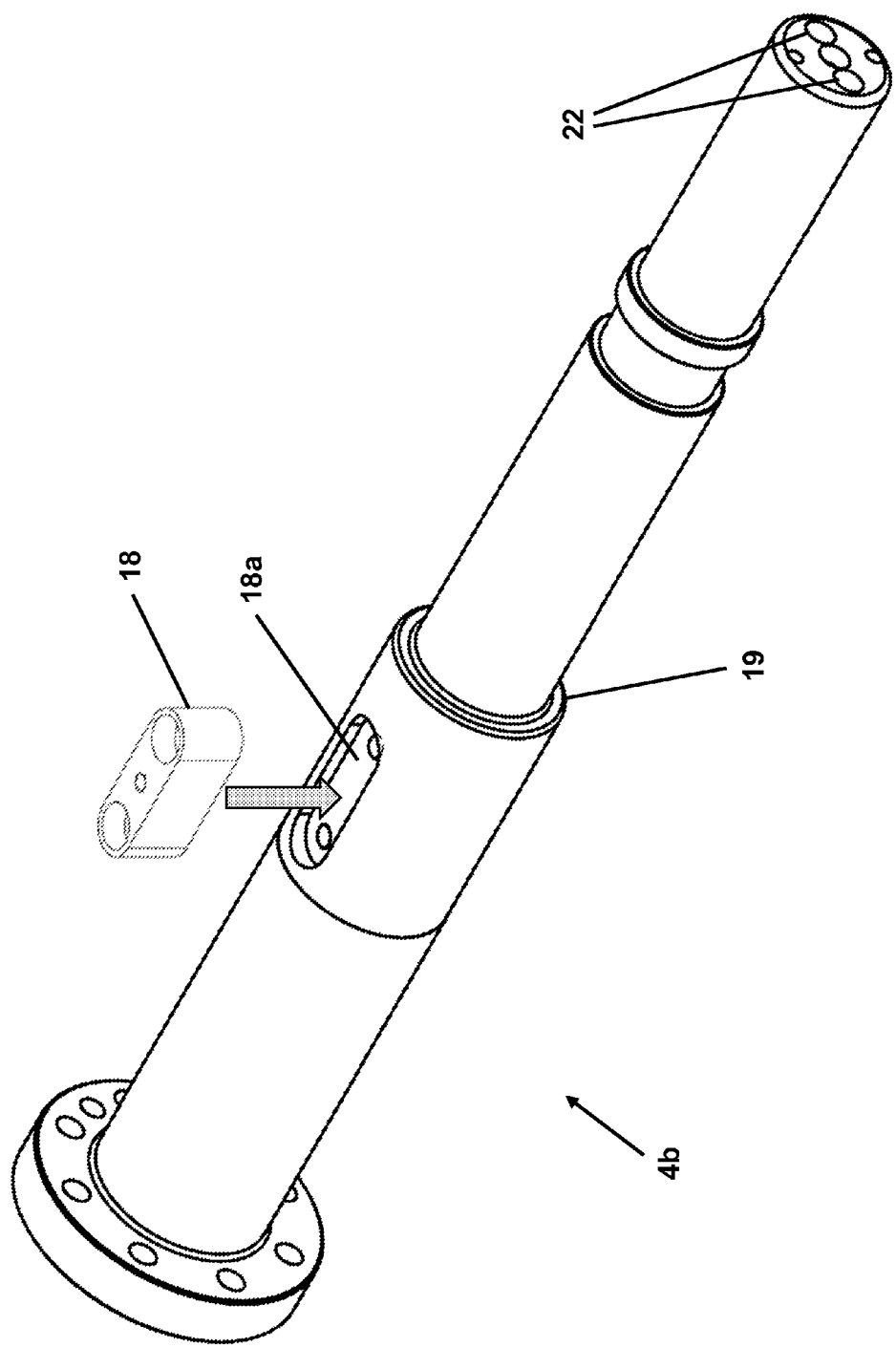
FIG. 9 is a perspective view of the solid shaft of the drive mechanism.
Figure 10:
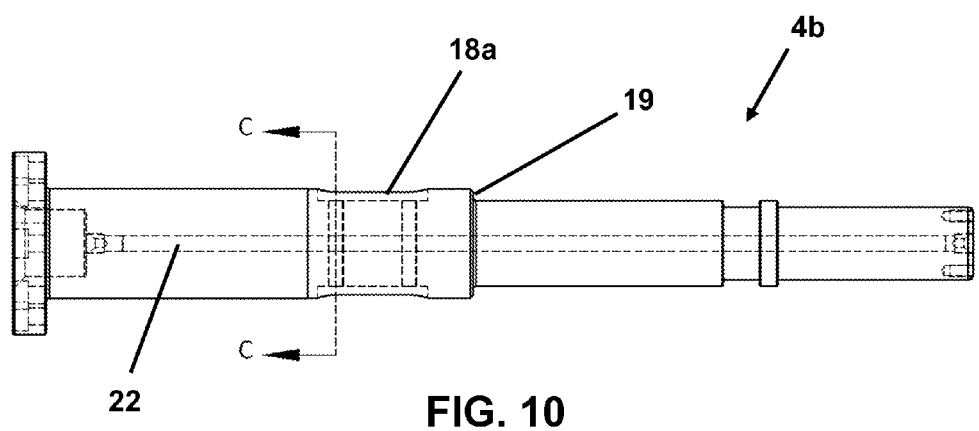
FIG. 10 is a side view of the solid shaft.
Figure 11:
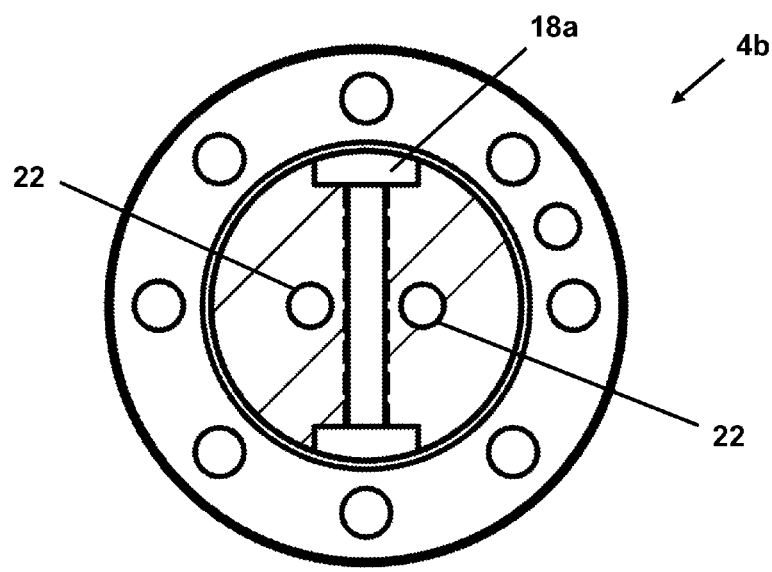
FIG. 11 is a sectional view of the solid shaft, along the line C-C in FIG. 10.
Figure 12:
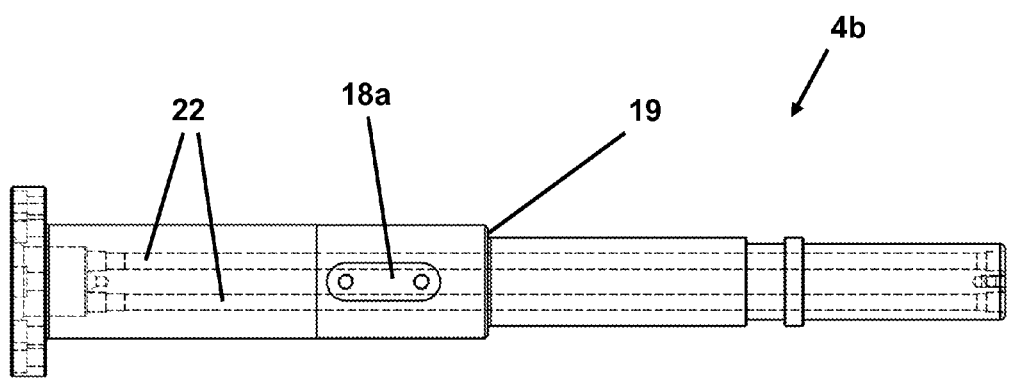
FIG. 12 is a top view of the solid shaft.
Figure 13:
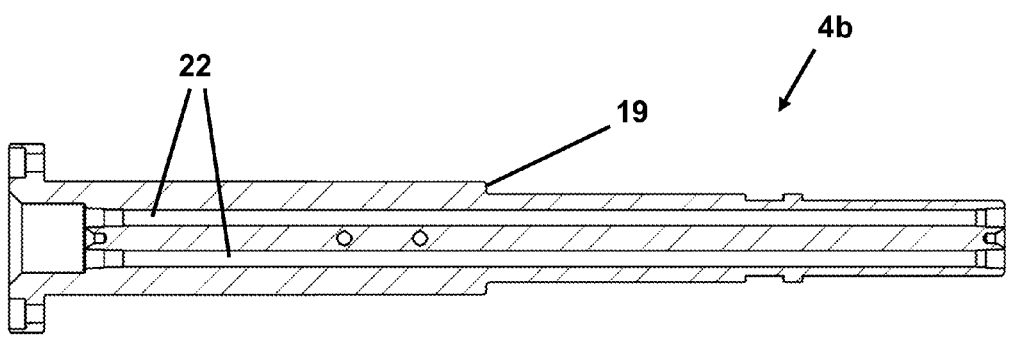
FIG. 13 is a sectional top view of the solid shaft.
Figure 15:
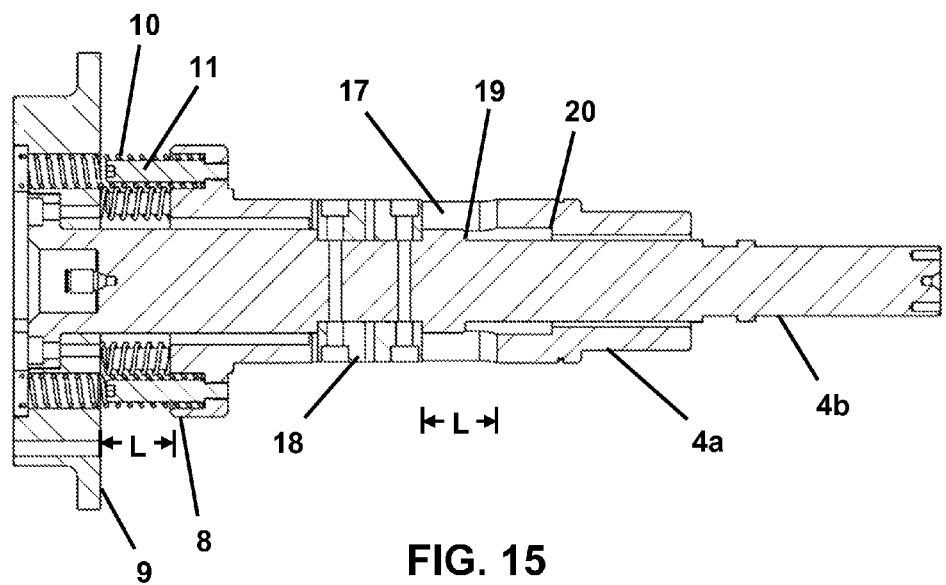
FIG. 15 is a sectional side view of the shaft assembly, with the contact plates, guide pins, and springs.

As shown in FIGS. 9-13, the solid shaft 4b is cylindrical having a diameter that allows it to slide within the hollow shaft 4a. The longitudinal travel of the solid shaft 4b within the hollow shaft 4a is restricted by drive keys 18 on the surface of the solid shaft 4b that slide in the keyway apertures 17. The drive keys 18 extend radially from the surface of the solid shaft 4b, as shown in FIGS. 3 and 9, and are shaped to fit within the keyway apertures 17 on the hollow shaft 4a to thereby rotationally couple the solid shaft 4b with the hollow shaft 4a. Preferably, the drive keys 18 are bolted to the surface of the solid shaft 4b within recesses 18a, as shown in FIG. 9. The shaft assembly 4 thereby permits relative axial motion between the shafts 4a and 4b, which feature is termed z-compliance. The length of the keyway apertures 17 and drive keys 18 define the maximum travel distance, or travel length L, of the relative axial motion between the shafts 4a and 4b, as shown in FIG. 15.

Additionally, the solid shaft 4b may also have a shoulder 19 that engages with a collar 20 within the hollow shaft 4a to limit axial motion of the solid shaft 4b relative to the hollow shaft 4a in one direction.

As shown in FIG. 3, a jawed gripper 6 is attached to the end of the solid shaft 4b and is thereby rotated. The gripper 6 has a front locating face 21 which makes contact with one end of the thread protector, or coupling, which is then gripped by the gripper 6 for placement on a threaded pipe end. The gripper 6 operates a plurality of gripper jaws 7 to grip the thread protectors. Preferably, the gripper 6 is pneumatically powered and receives compressed air through air passages 22 within the solid shaft 4b to actuate the gripper jaws 7. A rotary passthrough 23 is attached to the end of the solid shaft 4b opposite the gripper 6 and sits outside the housing 2. The rotary passthrough 23 has a rotating portion and a static portion to provide for compressed air connections to power the gripper 6.

Figure 16:
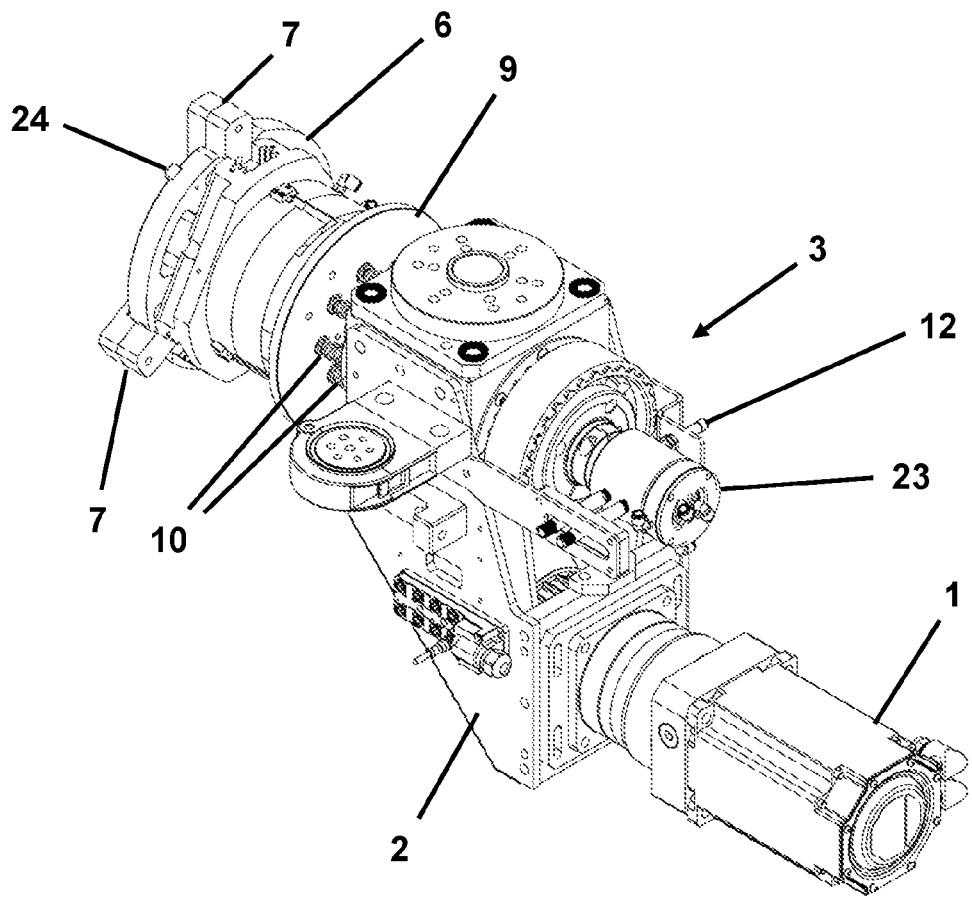
FIG. 16 is a perspective view of the drive mechanism, as shown in FIG. 1, with a drive lug on the front face of the gripper.
Figure 17:
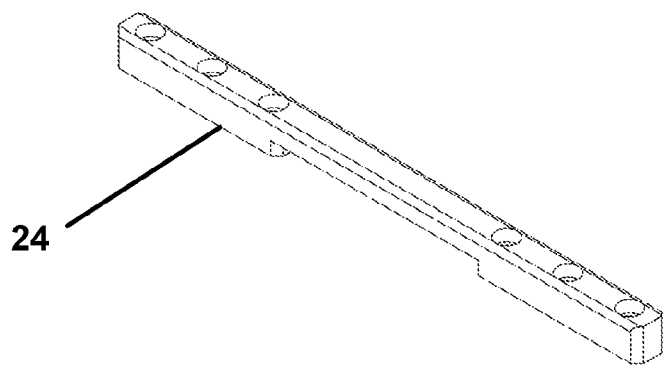
FIG. 17 is a perspective view of the drive lug.

A plurality of gripper jaws 7 are radially spaced apart about the circumference of the front face 21 of the gripper 6. Preferably, three gripper jaws 7 are provided on the gripper 6 and spaced equally apart radially on the front face 21. The gripper jaws 7 move radially inwardly and outwardly to grip and release the thread protector. The three gripper jaws 7 operate in unison to axially align the thread protector with the centre line of the shaft assembly 4. For low torque applications, the gripper jaws 7 may grip the thread protector during rotation and installation on the threaded pipe ends. For high torque applications, the forces applied to the circumference of the thread protector by the gripper jaws 7 can damage the plastic material commonly used to make thread protectors. Accordingly, as shown in FIGS. 16 and 17, a drive lug 24 is provided on the front face 21 of the gripper 6 that seats in a complementary recess on the thread protector to drive the rotation of the thread protector. Preferably, the drive lug 24 is a rectangular bar that extends across the front face 21 of the gripper, but other configurations of drive lugs 24 may be used to correspond with the configuration of the thread protector or coupling being applied to the threaded pipe end.

As shown in FIGS. 1-5 and 15, a plurality of coil springs 10 are mounted on guide pins 11 that extend between contact plates 8 and 9 and span the distance therebetween. The guide pins 11 are aligned with complementary holes in the contact plate 9 so as to permit compression of the springs 10 between the contact plates 8 and 9. Ordinarily, the springs 10 bias the contact plates 8 and 9 away from one another. The maximum distance between the contact plates 8 and 9 is defined by the travel length L, as described above and shown in FIG. 15.

With the contact plates 8 and 9 fully spaced apart, the gripper 6 is in a fully extended position and the drive keys 18 are abutting the forward end of the keyway apertures 17, as shown in FIG. 5. With the contact plates 8 and 9 abutting one another, or fully compressed, the gripper 6 is in a fully compressed position and the drive keys 18 are abutting the aft end of the keyway apertures 17. The maximum distance between the contact plates 8 and 9, or travel length L, may be specified as desired for the particular application by using drive keys 18 and the keyway apertures 17 with different relative lengths in the construction of the drive mechanism.

One or more sensors 12 are provided to monitor the relative axial motion between the solid shaft 4b and the hollow shaft 4a. Preferably, an optical or inductive sensor 12 is attached near the end of the solid shaft 4b opposite the gripper 6. This sensor 12 is positioned to detect the rotary passthrough 23 when the gripper 6 is in the fully extended position. When the gripper 6 is in the fully compressed position, the rotary passthrough 23 is no longer detected by the sensor 12. Additionally, or alternatively, a contact sensor 12 may be positioned adjacent the contact plate 8 to detect the contact plate 9 when the gripper 6 is in the fully compressed position.

The sequence of installation steps and method of installing a thread protector is as follows.

In a pipe manufacturing facility, a finished threaded pipe is moved to a known secure position, which defines the position of the pipe in space. This information permits the robot to axially align the drive mechanism with the longitudinal axis of the pipe. However, the position of the end of the pipe with respect to the drive mechanism is unknown because, for example, the pipe lengths may vary. The alignment of the longitudinal axis of the threaded pipe in space is known, regardless of variability in the length of each pipe. In order to determine the exact position of the pipe end, the robot advances the thread protector axially towards the pipe intentionally off-centre. The thread protector makes contact with the end of the pipe and the robot continues to advance the drive mechanism until the gripper 6 is in the fully compressed position. Because the position and dimensions of the thread protector are known by the robot controller, this action sequence permits the robot controller to determine the position of the pipe end.

Once the position of the pipe end is determined, the robot retracts and repositions the drive mechanism to align the thread protector with the pipe axially and begins rotating the thread protector and advancing the drive mechanism, each at a specified speed, to install the thread protector.

The RPM speed at which the gripper 6 is rotated and forward velocity at which the drive mechanism is advanced are determined by the thread pitch, or threads per inch, of the threaded pipe end. A mismatch between the speed at which the gripper 6 is rotated and the velocity at which the drive mechanism is advanced can result in damage to the threads of the pipe end or the thread protector. The damage is caused by "pulling" or "pushing" forces exerted on the threads as a result of the robot advancing the drive mechanism at a velocity that is too slow or too fast, respectively, relative to the speed at which the gripper 6 is being rotated. The z-compliance of the drive mechanism prevents this kind of damage, by permitting relative motion between the gripper 6 and the drive mechanism, as described above.

The drive mechanism can detect certain errors in the installation of the thread protector, such as a cross-threaded or stripped-threaded thread protector. Additionally, the drive mechanism can detect faulty pipe threads, resulting from errors in the manufacturing of the threaded pipes. There is also an expected level of torque that should be detected by the servo motor 1 at any given installation depth. If the torque at a particular installation depth increases above or decreases below a defined threshold level, the robot controller interprets this as a cross-threaded or stripped-threaded thread condition on the thread protector of pipe. Preferably, the threshold level of torque is defined by the expected level of torque that should be detected by the servo motor 1 at the installation depth when the threshold level is passed. An increase or decrease in torque may also be the result of faulty threads on the pipe end. The drive mechanism may then reverse the rotation of the gripper 6 to remove the thread protector, discard the thread protector, and attempt to install a new thread protector. Alternatively, the robot controller can stop the rotation of the gripper 6, actuate the gripper jaws 7 to release to thread protector, and alert an operator that an installation error has occurred.

The drive mechanism can provide an accurate turn count, or accurate installation depth, for the thread protector. The robot controller is able to track the number of rotations applied by the drive mechanism to the thread protector, permitting installation of the thread protector to a specified depth or turn count. The drive mechanism can also install a thread protector to a specified level of torque, or tightness, based on the voltage and current supplied to the servo motor 1.

The drive mechanism also permits the robot controller to determine the correct speed at which to rotate the gripper 6 and velocity at which to advance the drive mechanism. The robot positions the thread protector, as described above, then rotates the gripper 6 while advancing the drive mechanism at a faster velocity than required. When the gripper 6 is in the fully compressed position, the robot stops advancing the drive mechanism until the gripper 6 is in the fully extended position. The robot again advances the drive mechanism and can continue repeating these steps, in an alternating fashion, to "shuttle along" until the thread protector is secured on the pipe end, according to the specified criteria for the desired application, for example, a specified number of turns.

In high torque applications, the seating of the drive lug within the complementary recess on the thread protector requires a separate process, because the location or orientation of the complementary recess is unknown. First, the drive mechanism applies a specified number of initial turns at low torque with the thread protector gripped by the gripper jaws 7. The gripper jaws 7 then releases the thread protector and the robot advances the gripper 6 to the fully compressed position and rotates the gripper 6 slowly until the drive lug seats in the recess on the thread protector. The drive mechanism then rotates to apply the thread protector at the desired torque.

The foregoing description, together with the accompanying figures, have set out detail of the structure and function of the present invention, however, the disclosure is to be understood as illustrative of the preferred embodiments and changes may be made without departing from the scope of the invention set out in the following claims.

What is claimed is:

1. A drive mechanism for installing thread protectors on threaded pipe ends, comprising:
    a servo motor;
    a housing;
    a gripper;
    a coaxial rotationally coupled shaft assembly operationally connecting the servo motor and the gripper, wherein the gripper is mounted to the shaft assembly outside of the housing;
    a plurality of gripper jaws mounted on the gripper;
    a first contact plate mounted to the shaft assembly and a second contact plate mounted to the gripper, wherein the first and second contact plates are biased away from one another; and
    a sensor mounted on the housing to monitor the motion of the shaft assembly.

2. The drive mechanism of claim 1, wherein a plurality of springs are mounted on a plurality of guide pins between the first contact plate and the second contact plate to bias the first and second contact plates away from one another.

3. The drive mechanism of claim 1, wherein the drive mechanism is operationally attached to a robotic arm.

4. A drive mechanism for installing thread protectors on threaded pipe ends, comprising:
    a servo motor;
    a housing;
    a shaft assembly having a hollow shaft, rotatably mounted within the housing and operatively engaged with the servo motor to receive rotation therefrom, and a solid shaft, slidably mounted within the hollow shaft and rotationally coupled with the hollow shaft to permit relative axial motion between the solid shaft and the hollow shaft;
    a gripper mounted to the solid shaft outside of the housing;
    a plurality of gripper jaws mounted on the gripper;
    a first contact plate mounted to the hollow shaft and a second contact plate mounted to the gripper, wherein the first and second contact plates are biased away from one another; and
    a sensor mounted on the housing to monitor the relative axial motion between the solid shaft and the hollow shaft.

5. The drive mechanism of claim 4, wherein a plurality of springs are mounted on a plurality of guide pins between the first contact plate and second contact plate to bias the first and second contact plates away from one another.

6. The drive mechanism of claim 5, wherein the hollow shaft has an annular cross section and one or more keyway apertures about its circumference, and the solid shaft has one or more drive keys extending radially therefrom, and wherein the drive keys and keyway apertures are shaped such that the drive keys fit within the keyway apertures to rotationally couple the solid shaft with the hollow shaft and permit relative axial motion therebetween.

7. The drive mechanism of claim 6, wherein the shaft assembly has a maximum travel distance which the solid shaft is permitted to move relative to the hollow shaft, defined by the length of the keyway apertures and the drive keys.

8. The drive mechanism of claim 7, wherein the shaft assembly permits the gripper to move relative to the housing between a fully compressed position, wherein the first and second contact plates are in abutment, and a fully extended position, wherein the first and second contact plates are spaced apart by the maximum travel distance of the shaft assembly.

9. The drive mechanism of claim 8, wherein the sensor comprises one or more sensors configured to detect when the gripper is in the fully compressed position.

10. The drive mechanism of claim 8, wherein the sensor comprises one or more sensors configured to detect when the gripper is in the fully extended position.

11. The drive mechanism of claim 8, wherein the sensor comprises one or more sensors configured to detect when the gripper is in the fully compressed position and when the gripper is in the fully extended position.

12. The drive mechanism of claim 8, wherein the gripper has a front face and a drive lug, which is attached to the front face and configured to engage with a complementarily shaped recess on a thread protector.

13. The drive mechanism of claim 12, wherein the drive lug comprises a rectangular bar that extends across the front face of the gripper.

\* \* \* \* \*